United States Patent [19]

DeLong

[11] Patent Number: 5,173,096
[45] Date of Patent: * Dec. 22, 1992

[54] METHOD OF FORMING BUSHING PLATE FOR FORMING GLASS FILAMENTS WITH FORMING TIPS HAVING CONSTANT SIDEWALL THICKNESS

[75] Inventor: Mark P. DeLong, Sylvania, Ohio

[73] Assignee: Manville Corporation, Denver, Colo.

[*] Notice: The portion of the term of this patent subsequent to Aug. 25, 2009 has been disclaimed.

[21] Appl. No.: 728,168

[22] Filed: Jul. 10, 1991

[51] Int. Cl.⁵ .............................................. C03B 37/08
[52] U.S. Cl. .................................. 65/1; 65/2; 76/107.6; 76/4
[58] Field of Search ............. 65/1, 2; 29/163.6, 421.1; 76/107.6, 4

[56] References Cited

U.S. PATENT DOCUMENTS

| | | | |
|---|---|---|---|
| 2,335,135 | 11/1943 | Staelin . | |
| 2,360,373 | 10/1944 | Tiede . | |
| 2,407,295 | 9/1946 | Simison et al. . | |
| 2,482,299 | 9/1949 | Stevens . | |
| 2,489,508 | 11/1949 | Stalego . | |
| 2,527,502 | 10/1950 | Simison et al. . | |
| 2,814,657 | 11/1957 | Labino . | |
| 3,248,191 | 4/1966 | Canfield | 65/1 |
| 3,265,476 | 8/1966 | Roberson | 65/1 |
| 3,294,503 | 12/1966 | Machlan et al. | 65/1 |
| 3,300,288 | 1/1967 | Matthews | 65/2 |
| 3,309,184 | 3/1967 | Stalego | 65/1 |
| 3,352,653 | 11/1967 | Speth | 65/1 |
| 3,514,841 | 6/1970 | Woodward et al. | 65/1 X |
| 4,153,438 | 5/1979 | Stream | 65/2 |
| 4,292,862 | 10/1981 | Thompson | 76/4 |
| 4,437,869 | 3/1984 | Lecron et al. | 65/1 |
| 4,612,027 | 9/1986 | Marra | 65/1 |
| 4,617,041 | 10/1986 | Meerman | 65/2 |
| 4,620,859 | 11/1986 | Lin et al. | 65/2 |
| 4,622,054 | 11/1986 | Huey et al. | 65/2 |
| 4,636,234 | 1/1987 | Huey et al. | 65/2 |
| 4,666,485 | 5/1987 | Huey | 65/2 |
| 4,698,083 | 10/1987 | Shioura et al. | 65/2 |
| 4,704,149 | 11/1987 | Palamara et al. | 65/1 |
| 4,750,926 | 6/1988 | Berkey | 65/2 |
| 4,758,259 | 7/1988 | Jensen | 65/1 |
| 4,759,784 | 7/1988 | Shono et al. | 65/2 |
| 4,846,864 | 7/1989 | Huey | 65/1 |
| 4,886,535 | 12/1989 | Bhatti | 65/1 |
| 4,941,904 | 7/1990 | Barch et al. | 65/1 |

FOREIGN PATENT DOCUMENTS

| | | | |
|---|---|---|---|
| 0033871 | 8/1981 | European Pat. Off. | 65/1 |
| 483857 | 11/1970 | Japan | 65/1 |
| 61-261230 | 11/1986 | Japan | 65/1 |

OTHER PUBLICATIONS

The Manufacturing Technology of Continuous Glass Fibers Loewenstein Elsevier—Amsterdam, Oxford, N.Y. 1983 pp. 131-135.

*Primary Examiner*—Robert L. Lindsay
*Attorney, Agent, or Firm*—Cornelius P. Quinn

[57] ABSTRACT

A bushing plate for use in the production of glass fibers has an array of nozzle tips. Each nozzle tip is formed to have a frusto-conical body with a central aperture. The walls of the nozzle tips have a constant thickness such that the diameter of the central aperture varies over the elongate dimension of the tip. The feature of constant sidewall thickness allows the glass filament size to be selected by trimming the height of the tip such that the appropriate aperture diameter is obtained. The nozzle tips are formed by progressive punching of preformed embossments on a bushing plate.

4 Claims, 2 Drawing Sheets

METHOD OF FORMING BUSHING PLATE FOR FORMING GLASS FILAMENTS WITH FORMING TIPS HAVING CONSTANT SIDEWALL THICKNESS

FIELD OF THE INVENTION

This invention relates to bushing plates for use in the production of glass fibers and more particularly to a water cooled bushing plate having nozzles with constant sidewall thickness.

BACKGROUND ART

Glass fibers are produced by the attenuation of molten glass issuing from nozzles under the influence of gravity. The nozzles are normally contained in an array on a bushing plate.

A bushing plate is normally fabricated of a precious metal alloy, nominally 80% platinum and 20% rhodium, to be able to withstand the extremely high processing temperatures of glass and the presence of corrosive agents in the bushing environment. A bushing plate has a limited service life, and must be repaired or reclaimed for re-use of the precious metal alloy.

The productivity or throughput of a bushing plate is a function of the number of nozzle tips contained in the array on the plate. The nozzle tips must be formed with uniform dimensions to ensure consistency of the diameter of the resultant glass fibers. The bushing plate through its high material cost, limited service life and accuracy requirements is a significant component of the cost of capital equipment used in glass fiber production.

A conventional bushing plate has tips formed with a constant diameter bore or aperture matched to the diameter of the glass fiber to be produced. As a result, each conventional bushing plate is specific to a predetermined glass fiber diameter, and separate tooling must be maintained for manufacture of variously sized bushing plates. A nozzle tip having a constant sidewall thickness is disclosed in terms of a modified Poiseuille equation in *The Manufacturing Technology of Continuous Glass Fibers*, 2nd ed. 1983 by K. L. Lowenstein @p.132.

DISCLOSURE OF THE INVENTION

The objective of the present invention is to provides a bushing plate with conical nozzle tips having constant sidewall thickness. The diameter of the nozzle tip bore may then be determined by selecting the length of the nozzle tip. In this manner a long nozzle tip will issue a glass fiber of relatively fine diameter, and a short nozzle tip will yield a glass fiber of relatively coarse diameter.

Preferably the constant sidewall thickness nozzle tips are used in combination with cooling tubes supported beneath and in proximity to the tips of the bushing plate. The cooling tubes circulate water for cooling the tips. This cooling below the tips is critical as it effects the melt rate and efficiency of attenuating glass fibers from the tips. A discussion of the effects of tip temperature on glass filament attenuation from a bushing plate is disclosed in copending U.S. patent application Ser. No. 680,332 which is hereby incorporated by reference.

A preferred method for forming such a bushing plate involves progressive punching of preformed embossments coined or raised from the surface of a plate. The progressive punching of the embossments causes cold flow of the material into the shape of the nozzle tip. The penetration of the punch into the embossment defines the central bore or aperture which issues molten glass. The heads of the punches are shaped to progressively form a conieal nozzle tip with constant sidewall thickness in the manner desire.

It has been found that a nozzle tip with a constant sidewall thickness allows for relatively closer spacing of the tips, e.g. as much as 30% closer, with resultant savings in precious metal costs.

The above object, features and advantages of the present invention are readily apparent from the following detailed description of the best mode for carrying out the invention when taken in connection with the accompanying drawings.

BEST MODE FOR CARRYING OUT THE INVENTION

Figure 1:
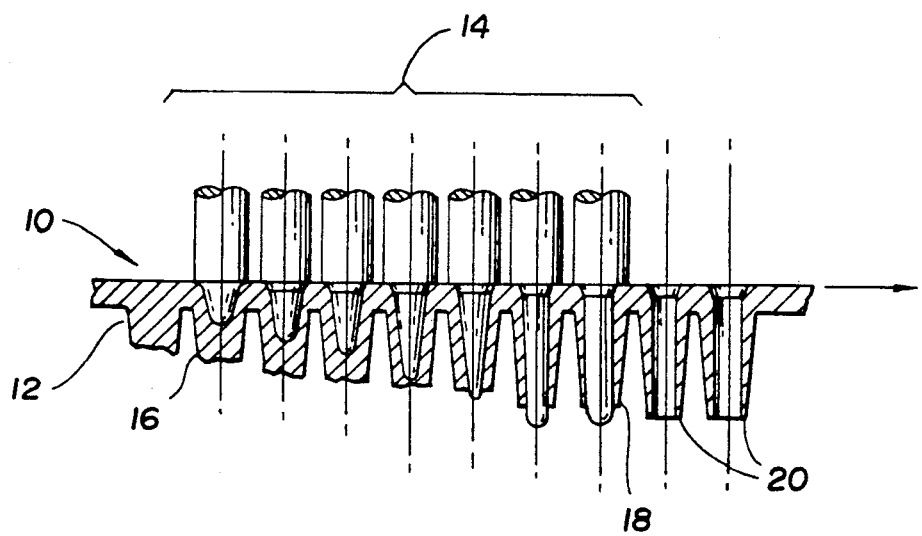
FIG. 1 is a diagrammatic view of a portion of a bushing plate as work-in-process showing the progressive punching of nozzle tips with constant sidewall thickness.

FIG. 1 illustrates the progressive punching of a bushing plate 10 preformed with embossments 12 raised from the surface of the plate. The embossments may be formed in accordance with the initial press operation disclosed in co-pending application entitled "Improved Bushing Plate For Glass Filaments And Method Of Forming" Ser. No. 07/714693, filed Jun. 6, 1991 whose disclosure is incorporated herein by reference.

A group of punches 14 forms the embossments 12 into conical nozzle tips having constant sidewall thicknesses. The initial punch of group 14 impacts the embossment 16 to a limited depth in diameter within the cold forming limitations of the material. More specifically, by limiting the displacement of material associated with each punch to about 15% of the material, the tendency for work-hardening is minimized.

The nozzle tip 18 is defined by the final punch of the group 14, whose dimensions match the desired shape of the bore within the nozzle tip. The nozzle tips 20 illustrate two tips which have been completely punched by the group of punches 14.

In a practical embodiment the punching of the conical nozzle tip with constant sidewall thicknesses is performed in a press operation. The plate 10 is progressively fed in steps through the press, as indicated by the arrow in FIG. 1 showing the direction of feed.

Figure 2:
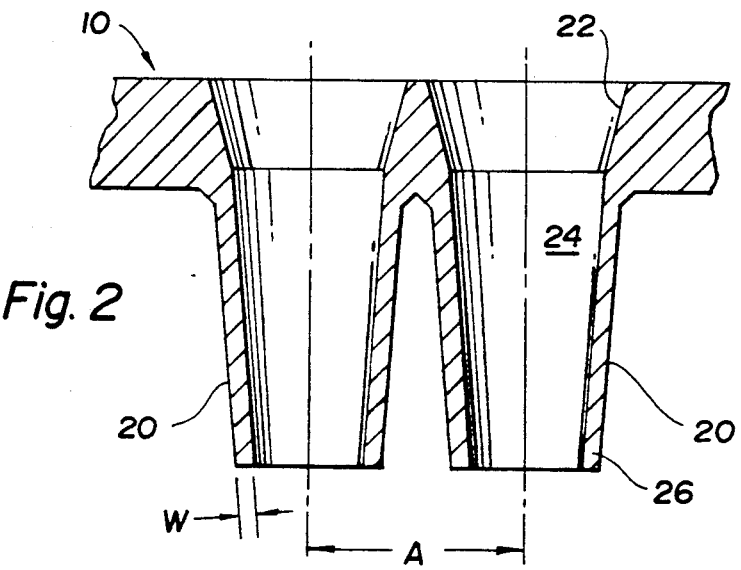
FIG. 2 is an enlarged, sectional view of a pair of finished nozzle tips according to the present invention.

FIG. 2 is an enlarged, cross-sectional view of the finished punched nozzle tips 20. It can be observed that each tip 20 has sidewalls 26 of constant thickness "W" over the elongated dimension of the nozzle tip. The nozzle includes a central bore 24 of frusto-conical shape matched to the shape of the nozzle tip body. The opening of the nozzle tip may be countersunk, as indicated at 22. The on-center spacing of the tips is indicated at "A."

It is believed that use of the conical tip and bore profile allows for relatively closer spacing of the nozzle tips, as much as up to 30% closer. This yields greater density packaging of the nozzle tips on the bushing plate and increases the productivity of the bushing plate.

Figure 3:
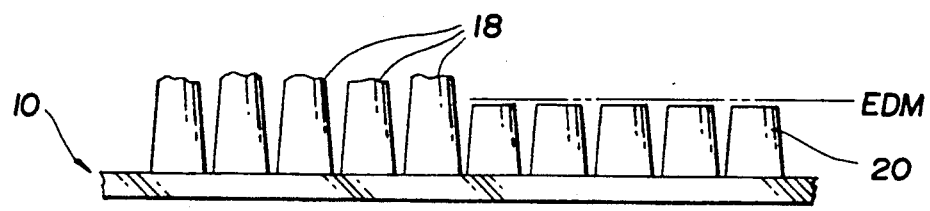
FIG. 3 is a schematic view of an electrical discharge machining wire trimming operation for finishing the ends of the nozzle tips to a predetermined.

FIG. 3 is a schematic view of an electrical discharge machining operation for trimming the ends of the nozzle tips 20 to a predetermined, uniform height. Again, a group of punched nozzle tips with unfinished ends are indicated at 18. The unfinished ends are shown slightly exaggerated in FIG. 3 for purposes of illustration. The punched nozzle tips 18 may be finished at their ends by any conventional trimming or finishing operation, such as electrical discharge machining wire trimming. The trimmed nozzle tips have a uniform height, which correlates to a certain size of bore opening for glass fibers of a predetermined diameter. The end finished nozzle tips are shown at 20.

Figure 4:
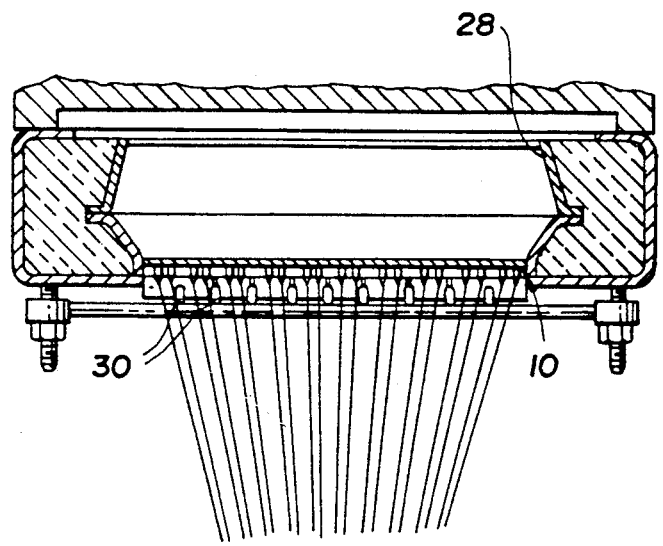
FIG. 4 is a cross-sectional environmental view of a bushing and cooling assembly of the present invention for attenuating molten glass or other heat softened material into fine continuous filaments.
Figure 5:
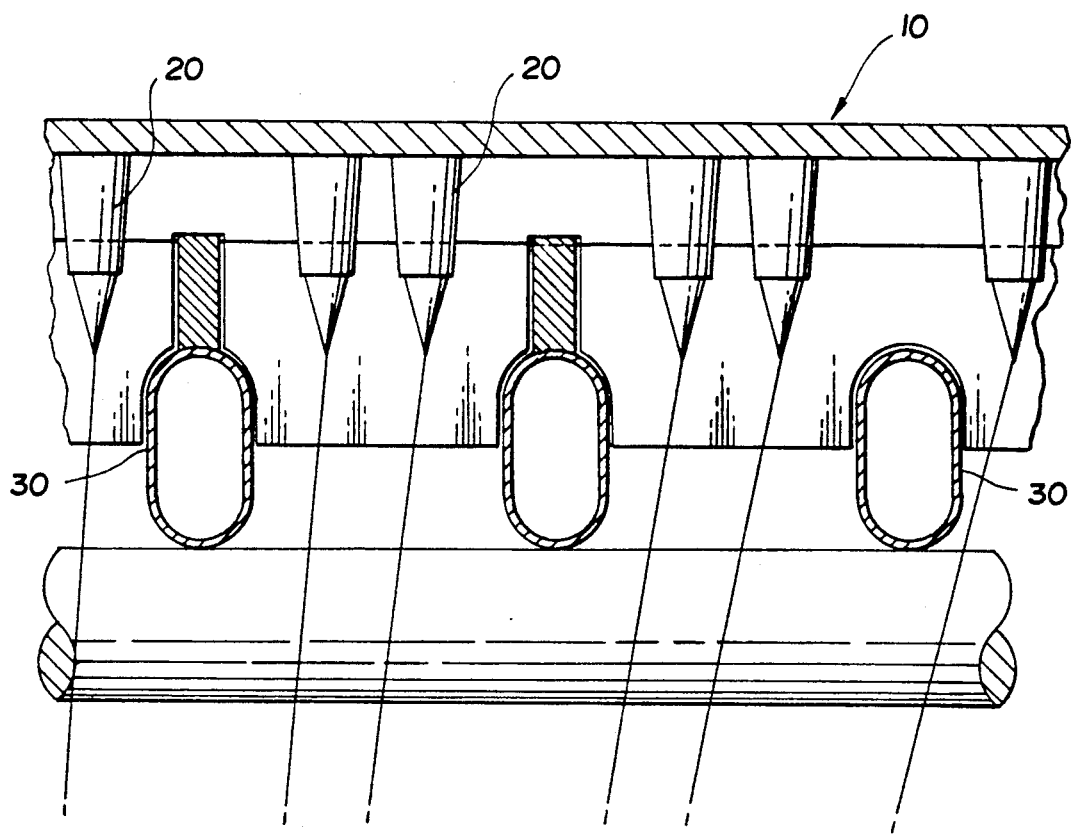
FIG. 5 is a fragmentary sectional view of the bushing and cooling section to better illustrate the relative positions of the bushing tips and cooling tubes.

FIG. 4 is an environmental view of the bushing plate 10, in a forehearth 28 which receives refined heat softened glass, illustrating the present invention in combination with cooling tubes 30. The cooling tubes 30, best seen in FIG. 5, are supported beneath and in proximity to the tips 20 and communicate water for cooling the tips. Molten glass drawn from forehearth 28 through tips 20 in bushing 10 is attenuated into glass filaments. The cooling tubes 30 are located below the tips 20 and cool the tips to provide a uniform temperature between various tips and to insure a more uniform temperature change in the glass fiber throughout the tip section. Preferably, cooling tubes 30 have an oval crosssection and extend longitudinally proximate rows of tips 20 on the bushing plate 10. Other embodiments of such cooling tubes are described in detail in copending U.S. patent application Ser. No. 680,332.

The use of constant sidewall thickness tips in the bushing environmnt with cooling tubes, as shown in FIGS. 4 and 5, has the advantage of allowing greater density packaging of the tips on the bushing plate. This of course yields more glass fibers and higher productivity.

The invention has been shown in an illustrative embodiment, and it is to be understood that alternative embodiments may suggest themselves to persons of skill in the art from the foregoing disclosure without departing from the scope of the following claims.

I claim:

1. A method for forming nozzle tips in a metal bushing plate used in glass filament production from a plate preformed with integral embossments in positions corresponding to the nozzle tips comprising the steps of feeding the preformed plate through a punching station and progressively punching the embossments to cause the metal to cold flow into nozzle tips having hollow bodies with frusto-conical outer shapes, frusto-conical bores extending completely therethrough with lower bore openings for the glass filaments to exit and walls of constant thickness; selecting a desired diameter for the lower bore openings of the nozzle tips to form glass filaments to a predetermined diameter; and finishing the ends of the nozzle tips to a predetermined, uniform length to obtain the desired diameter of the lower bore openings.

2. The method of claim 1 wherein the punching is performed in a press operation.

3. The method of claim 1 wherein the finishing step is performed by an electrical discharge machining wire trimming operation.

4. The method of claim 1 wherein each progressive punch step is limited to displacement of about 15% or less of the material at the site of each punch.

* * * * *